(12) United States Patent
Gadbois et al.

(10) Patent No.: US 7,302,439 B2
(45) Date of Patent: Nov. 27, 2007

(54) INFORMATION MODEL MAPPING WITH SHARED DIRECTORY TREE REPRESENTATIONS

(75) Inventors: David Gregory Gadbois, Austin, TX (US); Mark Wahl, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 787 days.

(21) Appl. No.: 10/184,234

(22) Filed: Jun. 28, 2002

(65) Prior Publication Data

US 2004/0002955 A1    Jan. 1, 2004

(51) Int. Cl.
*G06F 17/30* (2006.01)
(52) U.S. Cl. ........................ 707/101; 707/100
(58) Field of Classification Search ........ 707/100–102, 707/1
See application file for complete search history.

(56) References Cited

U.S. PATENT DOCUMENTS

| | | | | |
|---|---|---|---|---|
| 5,678,045 | A * | 10/1997 | Bettels | 707/200 |
| 6,055,544 | A * | 4/2000 | DeRose et al. | 707/104.1 |
| 2005/0197828 | A1 * | 9/2005 | McConnell et al. | 704/9 |

OTHER PUBLICATIONS

PeterPin-Shan Chen, The entity-Relationship Model—Toward a Unified view of Data, Sep. 22-24, 1975, Massachusets Institute of Technology, vol. 1, p. 9-36.*
Representation of UDDI Businesses in the Directory, iPlanet UDDI Schema Guide, Chapter 1, Jan. 2002, pp. 5-22.
UDDI.org, Universal Description, Discovery and Integration, UDDI Technical White Paper, Sep. 6, 2000, pp. 1-12.
UDDI Operations, Jan. 9, 2002, pp. 1-8.
Bergeson, B.; Boogert, K., LDAP Schema for UDDI, Internet Draft, May 2002, pp. 1-23.
Wahl, M.; Jacobs, N.; Rata, C.; Benedict, J., SP-DNA Conceptual Model, Service Provider Directory-enabled Network Applications, Draft—Jun. 2000, pp. 1-32.
Wahl, M.; Jacobs, N.; Rata, C.; Benedict, J., SP-DNA Core Information Model/Schema, Service Provider Directory-enabled Network Applications, Draft—Jun. 2000, pp. 1-41.
Merrells, J.; Khazai, F., SP-DNA Requirements, Service Provider Directory-enabled Network Applications, Draft v2—Jun. 26, 2000, pp. 1-30.
Benedict, J.; Greene, N., SP-DNA Terminology, Service Provider Directory-enabled Network Applications, Draft v4—Jun. 25, 2000, pp. 1-18.

(Continued)

*Primary Examiner*—Cam-Linh Nguyen
(74) *Attorney, Agent, or Firm*—Brooks Kushman, P.C.

(57) ABSTRACT

A registry service is described which uses a partitioned publisher assertion recording and accessing scheme. A publisher assertion regarding a relationship between entities (e.g., business or other types of entities) is encoded within a directory information tree in a memory. The publisher assertion includes publisher assertion part nodes corresponding to entity nodes in the directory information tree. The publisher assertion is complete if all publisher assertion parts corresponding to entities in the relationship are present in the directory information tree. The service may include a network including directory servers and registry servers. The publisher assertions are manipulated by authorized publishers and accessed by users using a variety of techniques, the operations of which are performed by such parties and/or are encoded upon computer-readable media.

10 Claims, 9 Drawing Sheets

OTHER PUBLICATIONS

Benedict, J., SP-DNA Architecture, Service Provider Directory-enabled Network Applications, Draft v1—Feb. 23, 2000, pp. 1-10.

Gibson, B.; Srivastava, A., LDAP Subscriber Management Interoperability Specification, LDAP Subscriber Management Internet Draft, Feb. 28, 2000, pp. 1-60.

Sleeper, B., Why UDDI Will Succeed, Quietly: Two Factors Push Web Services Forward, The Stencil Scope, An Analysis Memo from the Stencil Group, Apr. 2001, pp. 1-7.

McKee, B., et al, UDDI.org, UDDI Version 2.0 API Specification, UDDI Open Draft Specification Jun. 8, 2001, pp. 1-81.

UDDI.org, University Description, Discovery and Integration, UDDI Executive White paper, Nov. 14, 2001, pp. 1-4.

UDDI.org, Universal Description, Discovery and Integration, UDDI Frequently Asked Questions (FAQ), 2001, pp. 1-15.

Internet draft for IETF by B. Bergeson and K. Boogert, entitled "LDAP Scheme for UDDI", May 2002, pp. 1-22.

* cited by examiner

INFORMATION MODEL MAPPING WITH SHARED DIRECTORY TREE REPRESENTATIONS

BACKGROUND

1. Field

The present invention relates to information processing systems, and, more particularly, to directory tree representations in the context of such systems (e.g., information model mapping for support of markup-oriented registry services using shared directory tree representations).

2. Description of the Related Art

Registry services can be used to provide information regarding business organizations. Many business organizations have relationships with other business organizations, whether such relationships be parent-subsidiary, peer-to-peer or other types of relationships. An efficient means of recording and publishing assertions regarding such relationships by different business organizations or their authorized publishing entities is needed. An efficient means of managing such publisher assertions is also needed.

BRIEF DESCRIPTION

In one embodiment, an apparatus includes a publisher assertion regarding a relationship between first and second entities (e.g., business or other types of entities). The publisher assertion is encoded within a directory information tree in a memory. The publisher assertion includes first and second publisher assertion nodes. The first publisher assertion node corresponds to a first entity node in the directory information tree, and the second publisher assertion node corresponds to a second entity node in the directory information tree. The first publisher assertion node includes information regarding a relationship between the first and second entities, and the second publisher assertion node includes information regarding the relationship between the first and second entities. In a further embodiment, the apparatus includes an information processing system including a memory and directory server software for accessing the directory information tree in the memory responsive to messages from another information processing system. In yet a further embodiment, the apparatus provides a registry service. The registry service is implemented using at least one directory server system including the information processing system, and at least one registry server system coupled to the directory server system via a network connection. The registry server system is coupled to modify the publisher assertion in the directory information tree.

In another embodiment, a method of processing information regarding related organizations includes providing a directory information tree configured to store publisher assertions by storing related publisher assertion parts in different tree nodes. In a further embodiment, the method includes the steps of accessing the directory information tree to determine any complete publisher assertions regarding a relationship between a plurality of organizations, and returning information regarding organizations about which complete publisher assertions exist regarding the relationship in the directory information tree. In another further embodiment, the method includes the step of attempting to save in the directory tree a publisher assertion part regarding each of a plurality of organizations in each of a plurality of publisher assertion nodes subordinate to each of a plurality of organizational nodes corresponding to each of the organizations, respectively. In yet another further embodiment, the method includes the steps of collecting publisher assertion parts from the directory information tree into a list for organizations owned by a publisher, deleting from the list any duplicate publisher assertion parts, and returning a message including information regarding the list. In yet another further embodiment, the method includes the steps of collecting publisher assertion parts from the directory information tree into an owned assertions list for organizations owned by a publisher and classifying the publisher assertion parts in the list into first and second sets depending on relationships between organizations identified by the publisher assertion parts. A complete assertion list may be appended with information regarding each publisher assertion part in the first set which has a complementary publisher assertion part in the second set. An incomplete assertion list may be appended with information regarding each publisher assertion part in the first set which does not have a complementary publisher assertion part in the second set. Messages may then be returned including information regarding the complete assertion list and/or the incomplete assertion list. Individual software partitions may be used to perform the steps, and some software partitions may perform more than one of the steps.

In another embodiment, a graph data structure is encoded on at least one computer-readable medium. The graph data structure is representable by a plurality of nodes coupled by edges. The plurality of nodes includes first and second organizational nodes corresponding to first and second organizations, respectively. The structure further includes a first relational node which corresponds to the first organizational node to provide access to first relation information regarding a relation between the first and second organizations. The first relation information is used to indicate a valid relationship if the graph includes a second relational node corresponding to the second organizational node to provide access to second relation information complementary to the first relation information. In a further embodiment, the graph data structure is a directory information tree configured to include the first and second relational nodes as descendents of the respective first and second organizational nodes.

In another embodiment, a computer program product includes at least one computer-readable medium, and software encoded on the at least one computer-readable medium for accessing a directory information tree data structure configured to access publisher assertions by accessing related publisher assertion parts in different tree nodes.

The foregoing provides a brief description, or summary, of certain embodiments discussed in greater detail in the detailed description below. Consequently, the foregoing contains, by necessity, simplifications, generalizations and omissions of detail. Consequently, those skilled in the art will appreciate that the foregoing summary is illustrative only and that it is not intended to be in any way limiting of the invention. Other aspects, inventive features, and advantages of the present invention, as defined solely by the claims, may be apparent from the detailed description set forth below.

BRIEF DESCRIPTION OF THE DRAWINGS

The present invention may be better understood, and its numerous objects, features, and advantages made apparent to those skilled in the art, by referencing the accompanying drawings. The use of the same reference symbols in different drawings indicates similar or identical items.

DETAILED DESCRIPTION

The following discussion is intended to provide a detailed description of at least one example of the invention and should not be taken to be limiting of the invention itself. Rather, any number of variations may fall within the scope of the invention which is properly defined in the claims following this description.

Figure 1:
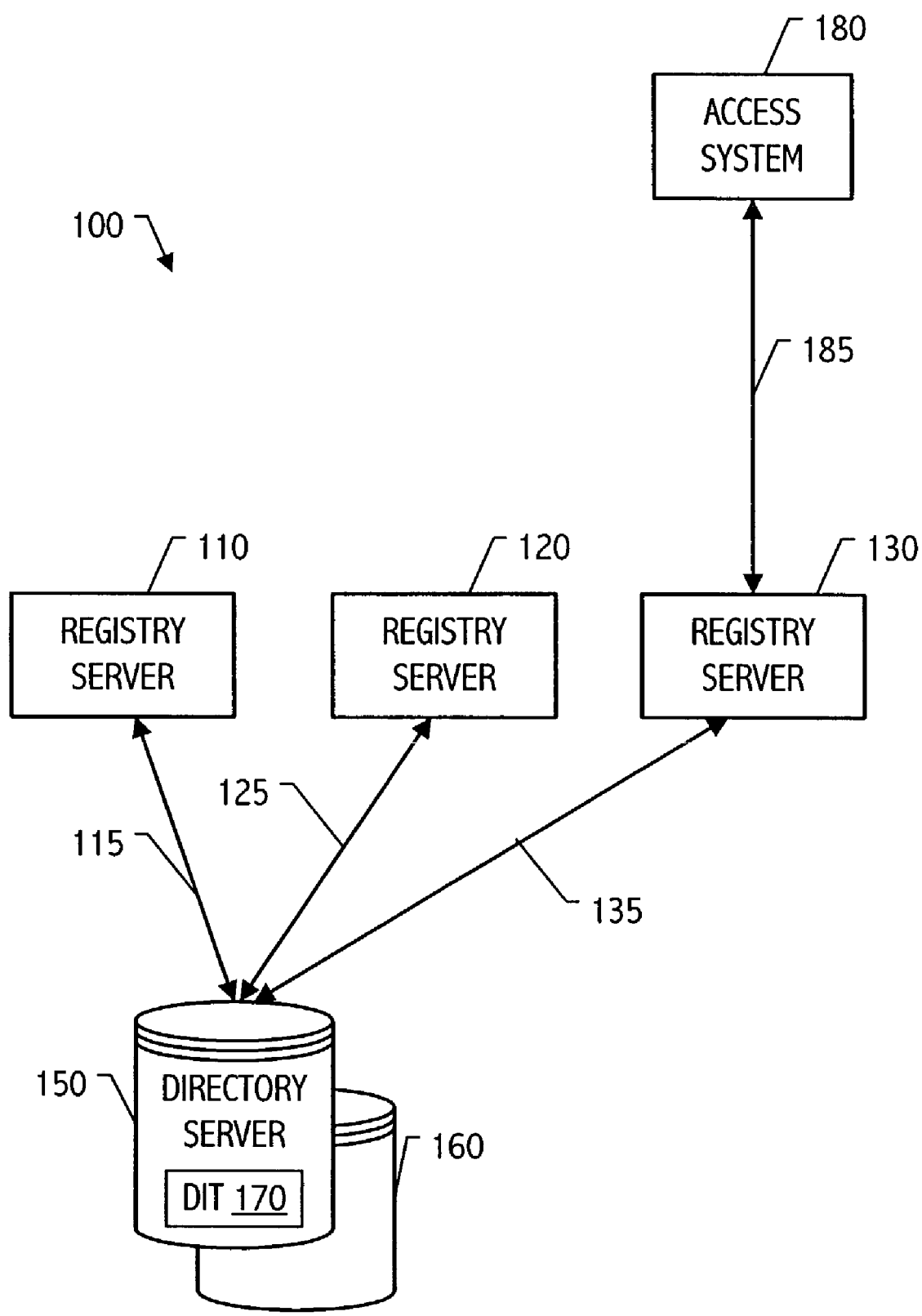
FIG. 1 is a block diagram of a network including one embodiment of a directory information tree (DIT) according to the invention.

FIG. 1 is a block diagram of an information processing network 100 for providing a registry service such as a Universal Description, Discover and Integration (UDDI) business registry. Network 100 includes registry servers 110, 120 and 130, directory servers 150 and 160, and access system 180. In the embodiment shown, directory servers 150 and 160 are collocated, although collocation is not required. Also in the embodiment shown, directory servers 150 and 160 are coupled to registry server 110 via network coupling 115, to registry server 120 via network coupling 125, and to registry server 130 via network coupling 135. Other couplings may be used, as appropriate. Registry server 130 is coupled to access system 180 via coupling 185.

Access system 180 is representative of any access point to network 100. As such, access system 180 may be any appropriate type of information processing system, for example, which allows administrators, clients, or any other type of user access to a registry server. In one embodiment, access system 180 is a personal computer or workstation. In the embodiments described herein, access system may be an access point for a client user, a publishing entity or any other party, and as such, access system 180 is representative of a variety of access points to network 100. Thus, although only one access system is shown in FIG. 1, it is expected that many such access points will be used. Also, although some of the following discussions describes various entities accessing registry server 130 and directory server 150 from access system 180, access to the network 100 registry service may be through other access systems, registry servers and directory servers.

In the embodiment shown, redundant registry servers are deployed to enhance performance and/or reliability. Registry server 130 is a server system for receiving, processing and responding to registry service request messages sent by registry service users. In one embodiment, registry server 130 is a software server operating on a compatible hardware platform. In another embodiment, registry server 130 is a computer system. Each registry server is coupled to one or more directory servers such as directory servers 150 and 160. Additional, replicated directory servers may also be added to further increase reliability. Each directory server is a software server and/or computer system including one or more persistent data storage areas or devices. Directory server 150 provides a database for storing registry service information, and may take any appropriate form which provides sufficient storage space and processing hardware and software to access the storage space.

One type of directory server is a Sun ONE directory server. The Sun ONE Directory Server is a software product that provides a central repository for storing and managing identity profiles, access privileges and application and network resource information. Information stored in the Sun ONE Directory Server can be used for the authentication and authorization of users to enable secure access to enterprise and Internet services and applications. It provides a multiple database architecture and enables developers to use a markup language (e.g., XML) tag library to perform Lightweight Directory Access Protocol (LDAP) operations on data in the directory.

One role of a registry service is to support the storage and retrieval of data. In operation, a user at access system 180 accesses registry server 130 by sending an initial message to registry server 130 via network coupling 185. Then, depending on the content of the message, registry server 130 accesses directory server 150, for example, to perform certain functions indicated by the message. If information stored at directory server 150 is changed, the changed information is then made available to other registry servers such as registry servers 110 and 120. Often, more than one message passes between registry server 130 and directory server 150 before a result message can be provided to the user at access server 180 by registry server 130 responsive to the initial message from the user.

Figure 2:
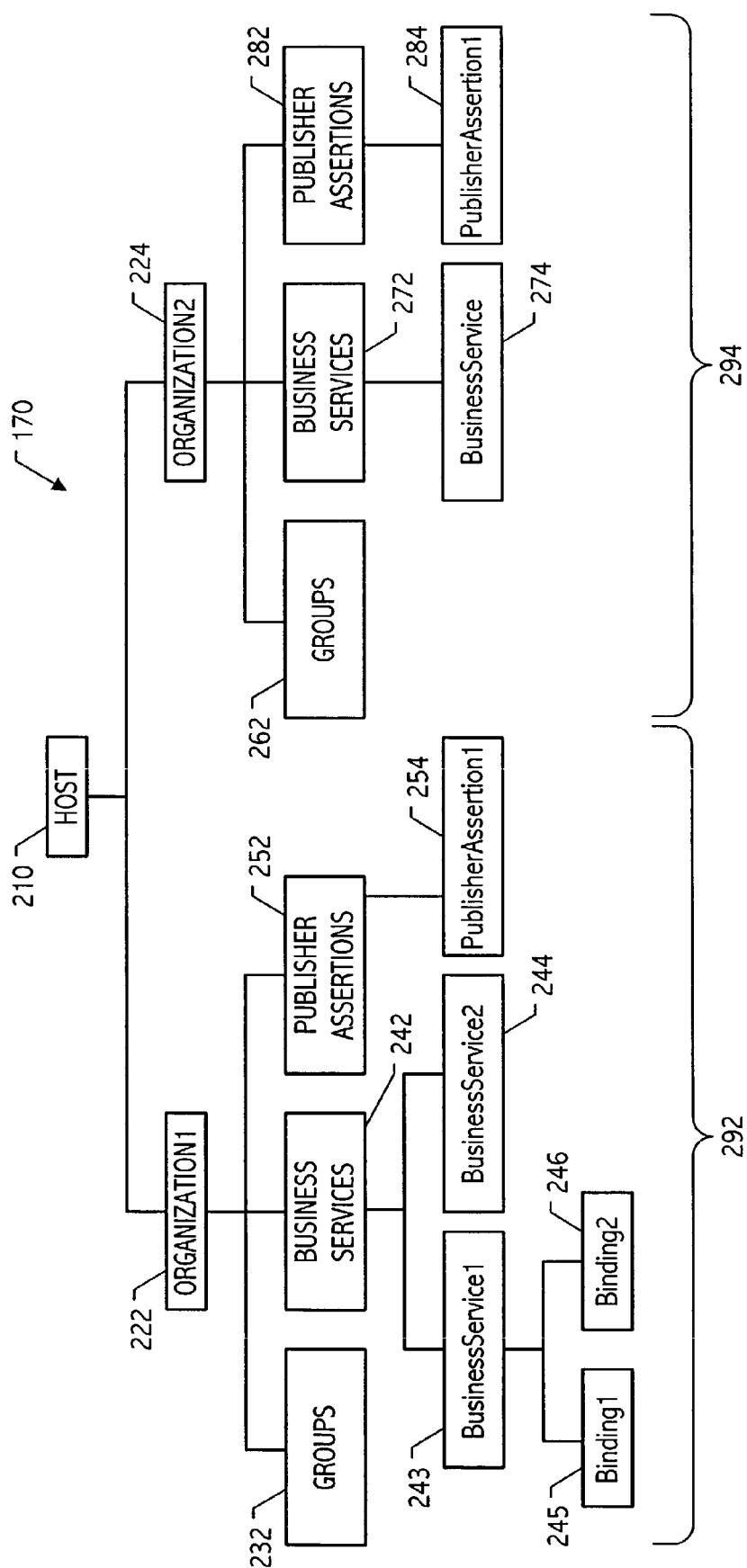
FIG. 2 is a block diagram illustrating the DIT of FIG. 1.

Directory server 150 stores information for access by the user through this process. Information stored on directory server 150 may be stored in a tree-like structure. This mirrors the tree model used by most file systems and is sometimes referred to herein as a directory, directory tree or a directory information tree (DIT). One example of such a DIT, DIT 170, is shown in FIG. 2. As its name implies, DIT 170 provides a directory of information in a data tree format. The tree is populated by a plurality of nodes. Object classes are used to define each node in the DIT. In one embodiment, the DIT is an LDAP directory.

A root node is maintained by the host system (e.g., directory server 150), and is represented by Host node 210. Of course, each directory server may maintain more than one DIT, and therefore more than one "Host" or root node. A first tier or set of interior nodes coupled to the host node include a set of nodes representative of organizations. For example, an Organization1 is represented at node 222, and Organization2 is represented at node 224. Each organizational node is a "root" node for an organizational sub-tree such as sub-trees 292 and 294 shown in FIG. 2. Typically, Organization1 and Organization2 are businesses or other types of commercial entities, but the organizations represented in the organizational tier may be any type of entity such as governmental, institutional, academic and personal, to name a few.

Each organizational node is typically coupled to a number of interior sub-nodes which contain further information, or links to further information, regarding the respective organization. For example, Groups node 232 includes information regarding groups of Organization1. BusinessServices node 242 provides a branching point for sub-nodes which include information regarding business services of Organization1 such as BusinessService1 node 243 and BusinessService2 node 244. BusinessService1 is accessible via information represented at Binding1 node 245 and at Binding2 node 246. One exemplary type of binding is a uniform resource locator (URL). Similarly, DIT 170 includes subnodes of Organization2 node 224 which include information regarding groups (node 252) and business services (nodes 273 and 274) of Organization2.

For further example, PublisherAssertions node 252 in Organization1 sub-tree 292 provides a branching point to nodes which include information regarding relations between Organization1 and other organizations. PublisherAssertion nodes are so-called because publishing organizations ("publishers") are authorized to make or "assert" relational statements regarding organizations. A properly populated PublisherAssertion1 node 254 could include relational information indicating, for example, that Organization1 is the same as Organization2 (an identity relation), that Organization1 is a parent or child (e.g., a subsidiary) of Organization2, or that Organization1 is a peer of Organization2. and publisher assertions (nodes 282 and 284).

Each publisher assertion node provides one-half of a complete assertion. A publisher assertion for two organizations is incomplete until the assertion has been made by an authorized publisher for each organization in each organization's respective sub-tree. For example, an assertion that Organization1 is the parent of Organization2 at PublisherAssertion1 node 254 in Organization1's sub-tree 292 is incomplete unless a complementary assertion that Organization2 is the child or subsidiary of Organization1 at PublisherAssertion1 node 284 in Organization2's sub-tree 294.

Although the discussion herein primarily relates to the most commonly used two-way relationships, and although such discussion primarily uses two-way terminology such as "half assertions," other embodiments may use three-way relationships or more. In such embodiments, terminology indicating two parts of an assertion such as "half" or "halves" should be interpreted to mean "part" or "parts." For example, in a three-way joint-venture peer relationship, a "half assertion" mentioned below should be interpreted as referring to a "part assertion" (e.g., a one-third assertion or perhaps even a two-thirds assertion depending on the context). In such a case, a publisher assertion would be complete if all part assertions are made.

Figure 3:
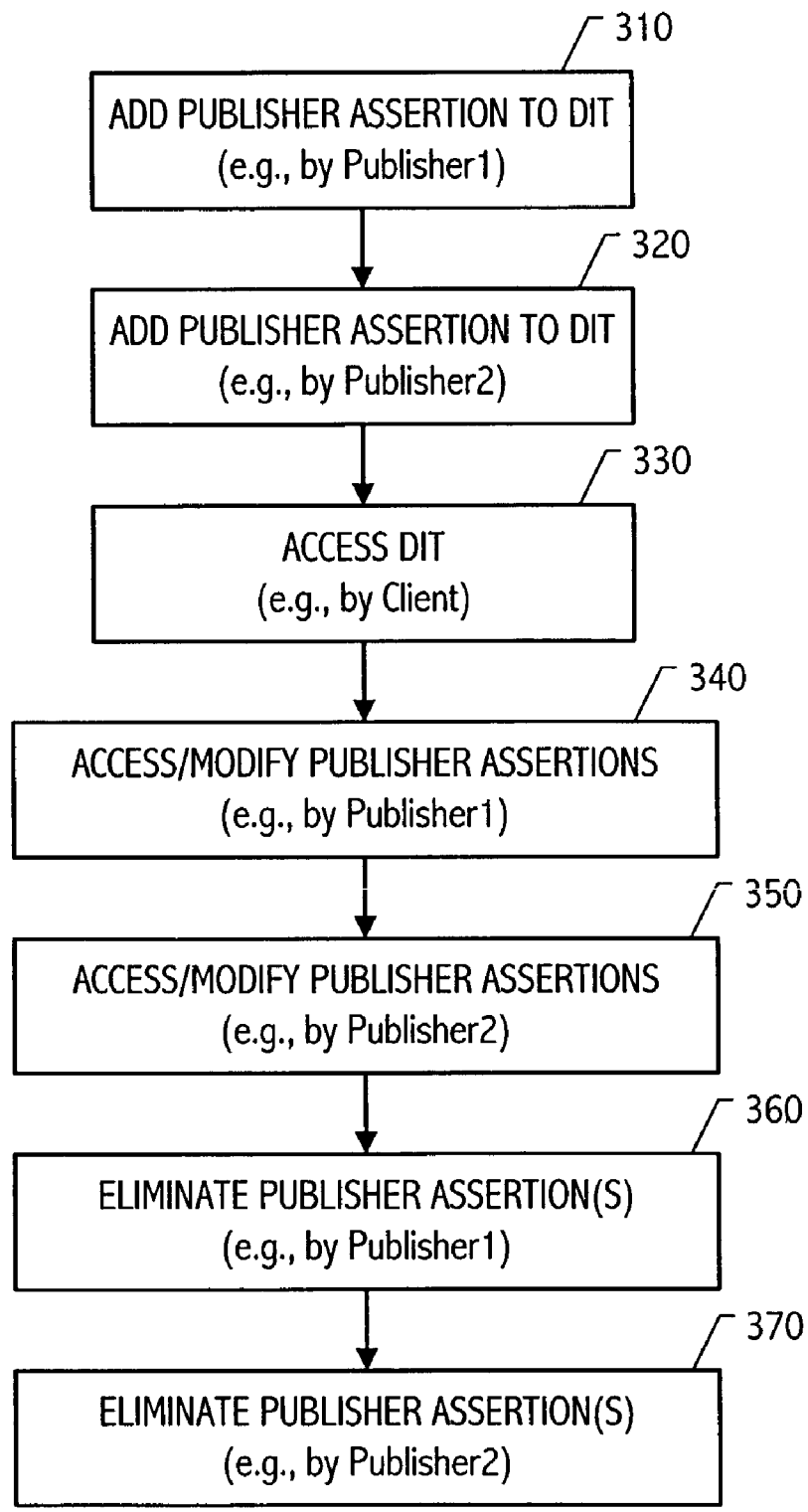
FIG. 3 is a flowchart showing a method of processing publisher assertions using the DIT of FIG. 1.

FIG. 3 is a flowchart showing an exemplary flow in which publisher assertions are processed using the DIT of FIG. 2. There are two classes of operations, the "publish API" and the "inquiry API". The publish API assumes registration and requires authentication. The inquiry API has no registration or authentication requirements. Operations 310, 320, 340, 350, 360 and 370 are in the publish API class. Operation 330 is in the inquiry API.

Referring to FIG. 3, a publisher assertion is made by a first publisher (e.g., Publisher1), and the publisher assertion is added to DIT 170 during first add operation 310. For example, PublisherAssertion1 may be added to DIT 170 by a Publisher1 who is authorized to publish such assertions for Organization1. If PublisherAssertion1 makes an assertion regarding a relationship between Organization1 and Organization2, PublisherAssertion1 is incomplete until complementary PublisherAssertion2 is added to DIT 170 during second add operation 320 by a Publisher2 who is authorized to publish for Organization2. One exemplary add operational flow is discussed below with reference to FIG. 5.

At least one of operations 310 and 320 must be completed for some other operations regarding publisher assertions to return meaningful results without error messages. If only one of operations 310 and 320 is performed properly, then the publisher assertion which was made in that operation is said to be incomplete. Once both operations 310 and 320 are completed for the same relationship, then the respective publisher assertion is said to be complete. For example, once both organizations agree upon their relationship with corresponding and complementary nodes in their respective sub-tree of DIT 170, then the publisher assertion is complete.

Publisher assertions are accessed by clients during client access operation 330. In the present embodiment, the client is neither registered nor authenticated prior to accessing the information stored in DIT 170. For example, a user may access DIT 170 on directory server 150 via access system 180 and registry server 130. Any of a variety of types of information accesses may be implemented. One exemplary client access flow is discussed below with reference to FIG. 5 in which a client accesses DIT 170 to find related businesses. As shown in FIG. 3 operation 330 occurs after operation 320. While this order is helpful to illustrate the successful life cycle of a publisher assertion, such an ordering of operations is not necessarily required, and may in fact be modified in actual practice.

Publisher assertions are processed by publishers during access/modify operations 340 and 350. The publishers modify or otherwise manipulate their respective published assertions during these operations. Publishers may only manipulate publisher assertions to which the respective publisher has access privileges or rights. Any of a variety of processing flows may be used to manipulate the publisher assertions. Some exemplary publisher processing flows are discussed below with reference to FIG. 6 in which a publisher gets all publisher assertions made by the publisher, and with reference to FIG. 7 in which a publisher gets a status report regarding publisher assertions made by the publisher. As shown in FIG. 3 operations 340 and 350 occur after operation 330. While this order is helpful to illustrate the successful life cycle of a publisher assertion, such an ordering of operations is not necessarily required, and may in fact be modified in actual practice.

The life cycles of publisher assertions end when they are eliminated from DIT 170 by publishers during elimination operations 360 and 370. The publishers eliminate their respective published assertions during these operations. Any of a variety of elimination flows may be used to remove publisher assertions from DIT 170. Some exemplary publisher assertion elimination flows are discussed below with reference to FIG. 8 in which a publisher deletes a specific publisher assertion, and with reference to FIG. 9 in which a publisher deletes a set of publisher assertions and reinitializes the DIT with a new set of publisher assertions. As shown in FIG. 3 operations 360 and 370 occur after operation 350. While this order is helpful to illustrate the successful life cycle of a publisher assertion, such an ordering of operations is not necessarily required, and may in fact be modified in actual practice.

Figure 4:
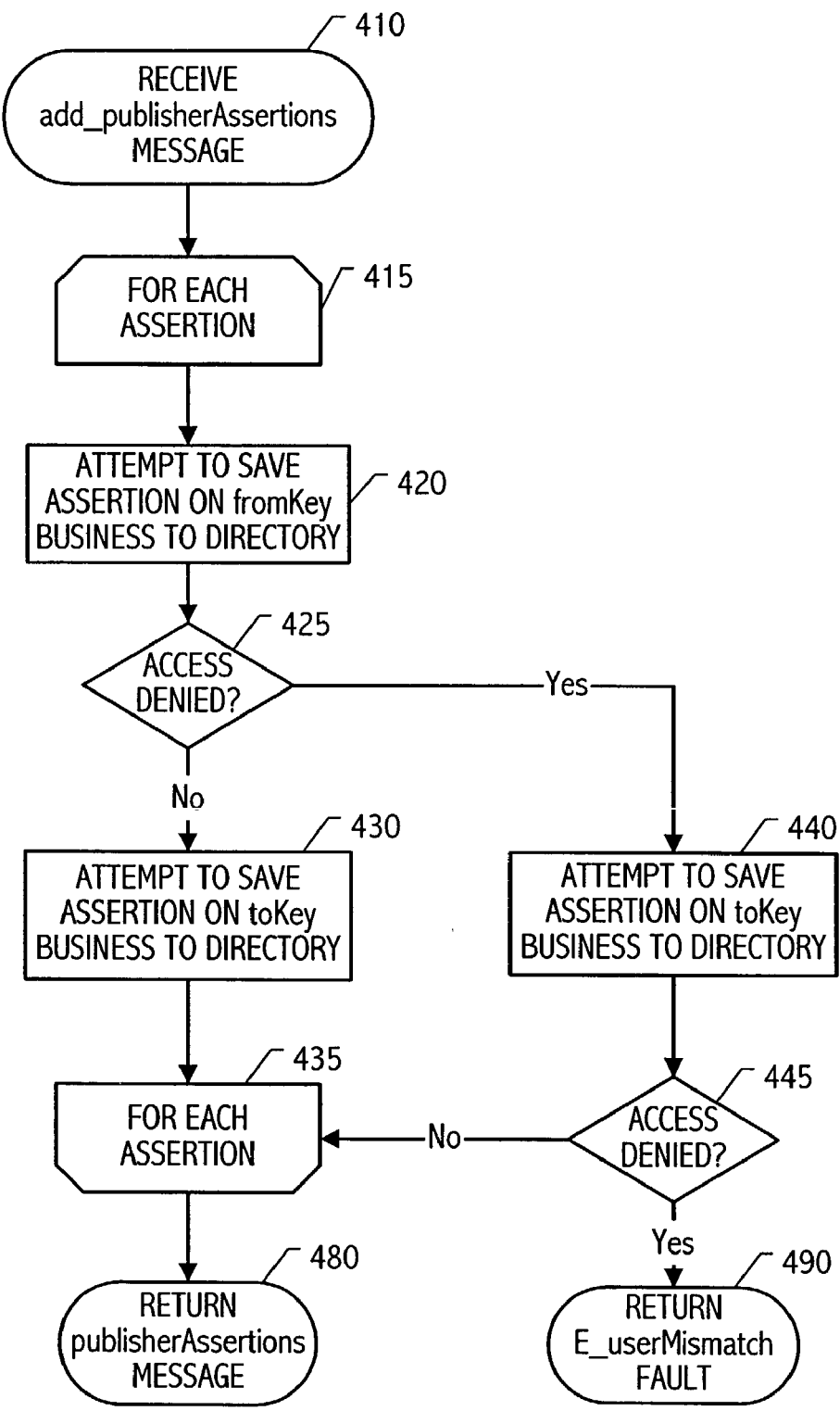
FIG. 4 is a flowchart showing a method of adding a publisher assertion to the DIT of FIG. 1.

FIG. 4 is a flowchart showing a method of adding a publisher assertion in DIT 170. An add_publisherAssertion message is received at registry server 130 from a user of access system 180 (e.g., a publisher) during operation 410. In the presently described embodiment, an add message includes a "fromKey" including information identifying a first organization of a relationship, a "toKey" including information identifying a second organization of a relationship, and a "keyedReference" including information identifying the relationship between the first and second organizations.

In one embodiment, the messages are encoded using XML. An exemplary message will include XML encoded information such as authorization information (e.g., a unique ID of the publisher) and the publisher assertion. The publisher association includes XML encoded constructs such as the aforementioned fromKey, toKey and keyedReference. In addition to identifying the relationship, the keyedReference may also include XML encoded information such as a Universal Description, Discover and Integration (UDDI) tModel identifier.

After the add message is received during operation 410, a set of operations are performed for each assertion beginning at operation 415. For each assertion, selected in turn, various attempts to save the assertion in DIT 170 are made. If the assertion is saved successfully in at least one node of DIT 170, the loop exits successfully at operation 435, and a return message is sent during operation 480 indicating such success to registry server 130 and then to the publisher at access system 180. If the assertion is not successfully saved in at least one node of DIT 170, an error message is returned during user mismatch fault operation 490, and the error message is sent to the publisher at access system 180.

More specifically, registry server 130 sends a first save message to directory server 150 during save operation 420. Directory server 150 attempts to save an assertion in the fromKey business sub-tree of DIT 170 responsive to receiving the save message during save operation 420. After the save is attempted during save operation 420, directory server 150 provides feedback to registry server 130, which in turn determines if access was denied (e.g., if the save was unsuccessful) during access decision 425.

If access was not denied during access decision 425, registry server 130 sends a second save message to directory server 150 during save operation 430. Directory server 150 attempts to save an assertion in the toKey business sub-tree of DIT 170 responsive to receiving the second save message during save operation 430. After the save is attempted during save operation 430, registry server 130 sends a message to the publisher at access system 180 indicating that a publisher assertion has been saved.

If access was denied during access decision 425, registry server 130 sends a another save message to directory server 150 during save operation 440. Directory server 150 attempts to save an assertion in the toKey business sub-tree of DIT 170 responsive to receiving the save message during save operation 440. After the save is attempted during save operation 440, directory server 150 provides feedback to registry server 130, which in turn determines if access was denied (e.g., if the save was unsuccessful) during access decision 445.

If access was not denied during access decision 445, registry server 130 sends a message to the publisher at access system 180 indicating that a publisher assertion has been saved. At this point, one incomplete toKey publisher assertion, or assertion half, has been saved, and the other publisher assertion half has not been saved.

If access was denied during access decision 445, registry server 130 sends an error message during fault operation 480 to the publisher at access system 180 indicating that a user mismatch fault has occurred, and that no publisher assertion has been saved.

In this manner, an attempt is made to save a complete publisher assertion by saving two separate and otherwise incomplete publisher assertions in each of two organizational sub-trees. If either one of these incomplete publisher assertions is saved, a message indicating success is returned. If neither one of these incomplete publisher assertions is saved, an error message is returned. If both of these otherwise incomplete publisher assertions are saved, then a complete publisher assertion has been saved to DIT 170.

Figure 5:
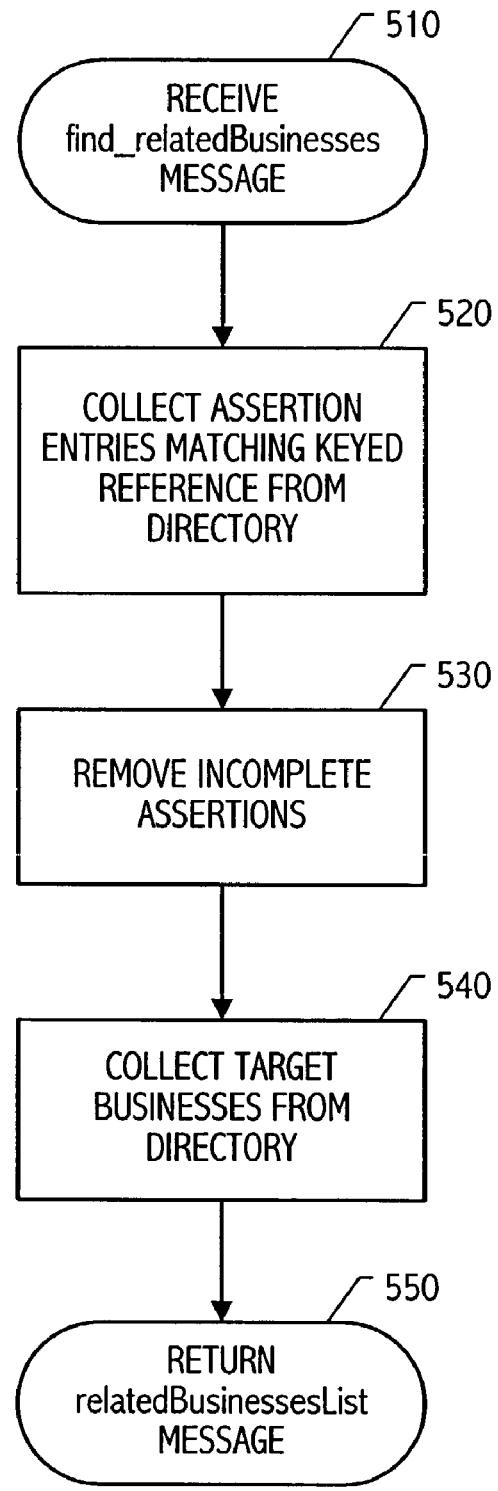
FIG. 5 is a flowchart showing a method of finding related businesses in the DIT of FIG. 1.

FIG. 5 is a flowchart showing a method of finding related businesses in the DIT of FIG. 1. A client user at access system 180 sends a find_relatedBusinesses message to registry server 130 during operation 510. As the name implies, the find_relatedBusinesses message allows a client (e.g., a registered or otherwise authorized user of the registry service provided by network 100) to find businesses related to a specified business within the directory information tree. Next, during collect operation 520, registry server 130 sends a message to directory server requesting collection of assertion entries which match a keyed reference in the find_relatedBusinesses message. Directory server 150 responds with a message including information regarding businesses related in a particular way to a business referenced in the collection message. Next, during remove operation 530, registry server 130 removes all incomplete assertions from the list of relations returned by directory server 150.

For example, a user might want to retrieve all subsidiaries of Company1, and registry server 130 might get as a result a list of companies for which some assertion has been made regarding a subsidiary relationship to Company1. Registry server then eliminates from the list any subsidiary relationship which is incomplete. For example, registry server 130 eliminates from the list any subsidiary relationship alleged by only one party to the relationship. If only the Company2 sub-tree contains a node for a publisher assertion regarding a relationship with Company1, and the Company1 sub-tree has no node which provides a complementary assertion, then the assertion is incomplete, and is removed from the list.

After incomplete assertions are removed from the returned list during remove operation 530, registry server sends a collection message to directory server 150 during collect operation 540, and directory server 150 responsively collects information regarding the specified target businesses form DIT 170 and sends a result message including the collected information to registry server 130. After collect operation 540, registry server returns a relatedBusinessesList message to the user at access system 180.

Figure 6:
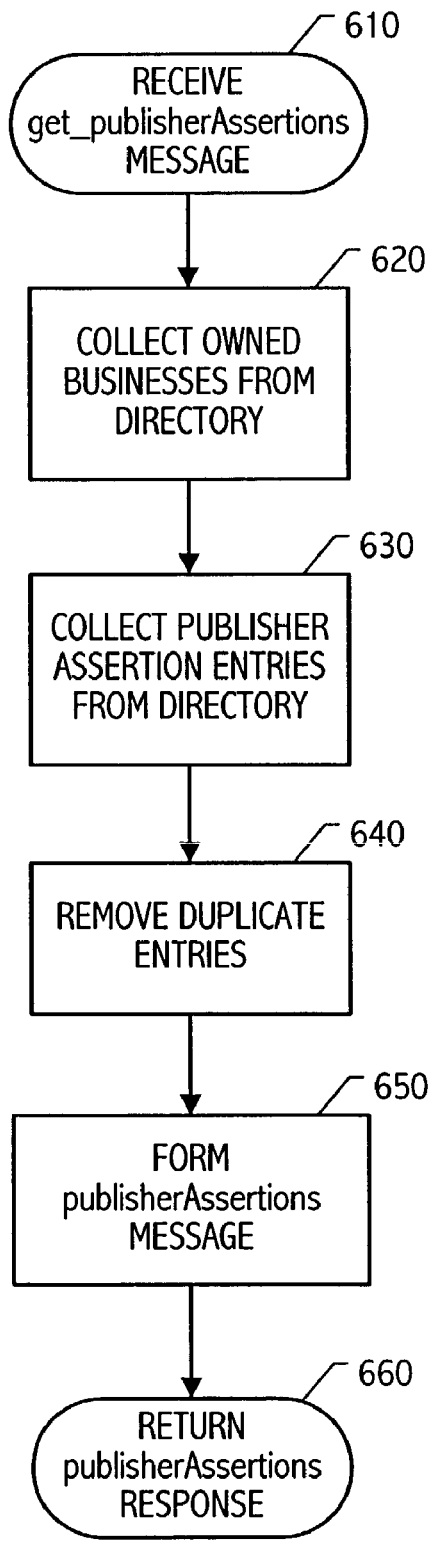
FIG. 6 is a flowchart showing a method of getting a publisher assertion in the DIT of FIG. 1.

FIG. 6 is a flowchart showing a method of getting a list of publisher assertions made by a publisher or which the publisher otherwise has rights to manage. During receive message operation 610, registry server 130 receives a get_publisherAssertions message from access system 180. Typically, an authorized publisher sends the message from access system 180 to registry server 130. After the get_publisherAssertions message is received during receive message operation 610, entries in a list of owned businesses are collected from DIT 170 during collect businesses operation 620. For example, registry server 130 sends a request message to directory server 150 instructing that all businesses, for which the publisher has authority to publish, be collected into a list. Directory server 150 returns a resulting list to registry server 130.

After collect businesses operation 620, all publisher assertion entries for each owned business are collected during collect assertions operation 630. For example, all publisher assertions for each business for which the publisher is authorized to publish are collected into a list by directory server 150 and provided to registry server 130.

After a list of publisher assertions is provided to registry server 130 during collect assertions operation 630, duplicate entries are removed during remove duplicates operation 640. For example, each complete publisher assertion includes two entries in DIT 170. Registry server 130 removes one of the two entries for each complete publisher assertion, and keeps one of the half publisher assertions as a record of the relationship. In another embodiment, the two respective halves of a complete assertion are combined into a single assertion list entry.

Next, a publisherAssertion message is formed during form message operation 650, and returned to the publisher at access system 180 during return message operation 660. The publisherAssertion message includes the publisher assertions remaining in the list after remove duplicates operation 640.

Figure 7:
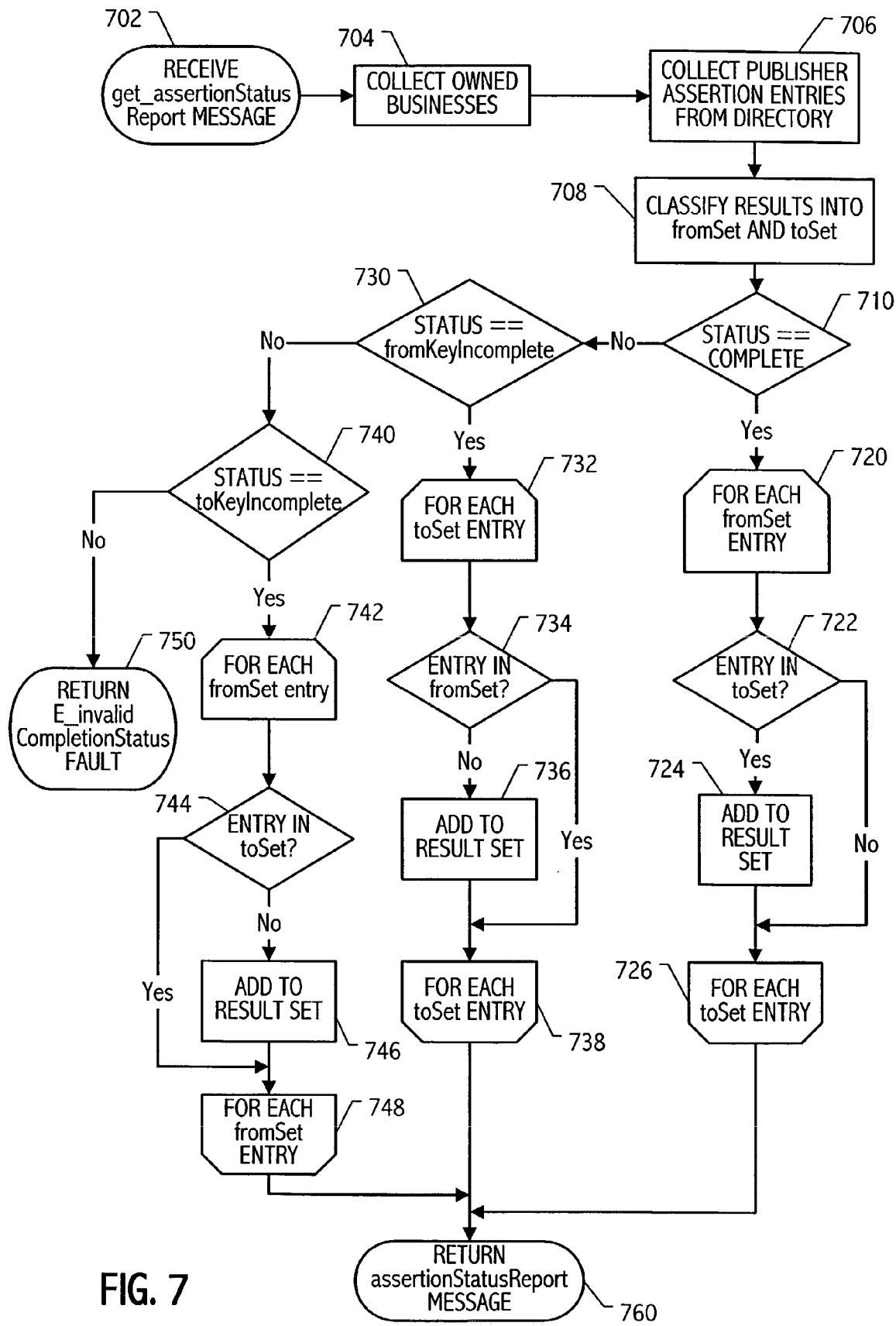
FIG. 7 is a flowchart showing a method of getting a publisher assertion status report using the DIT of FIG. 1.

FIG. 7 is a flowchart showing a method for a publisher to get a status report regarding a set of publisher assertions made by the publisher and stored in DIT 170. During receive message operation 702, registry server 130 receives a get_assertionStatusReport message from access system 180. Typically, an authorized publisher sends the message from access system 180 to registry server 130. After the get_assertionStatusReport message is received during receive message operation 702, entries in a list of owned businesses are collected from DIT 170 during collect businesses operation 704. For example, registry server 130 sends a request message to directory server 150 instructing that all businesses, for which the publisher has authority to publish, be collected into a list. Directory server 150 returns a resulting list to registry server 130.

After collect businesses operation 704, all publisher assertion entries for each owned business are collected during collect assertions operation 706. For example, all publisher assertions for each business for which the publisher is authorized to publish are collected into a list by directory server 150 and provided to registry server 130.

After a list of publisher assertions is provided to registry server 130 during collect assertions operation 706, entries in the list are classified into a fromSet and a toSet during classification operation 708. There will be possible complete assertions and incomplete assertions in each set.

For example, the following publisher assertion halves may be included in DIT 170 in Organization1 sub-tree 292:
- A) From=Organization1; To=Organization2; Relation=foo;
- B) From=Organization1; To=Organization2; Relation=bar;
- C) From=Organization2; To=Organization1; Relation=baz;

and the following publisher assertion half may be included in DIT 170 in Organization2 sub-tree 294:
- D) From=Organization1; To=Organization2; Relation=foo.

In this example, three publisher assertions regarding relationships foo, bar and baz between Organization1 and Organization2 are stored in Organization1's sub-tree 292, and one publisher assertion regarding relationship foo between Organization1 and Organization2 is stored in Organization2's sub-tree 294. One publisher assertion is complete regarding relationship foo between Organization1 and Organization2. See, for example, complementary publisher assertion halves A and D which comprise a complete assertion regarding the relationship foo.

In this example, the publisher assertion halves are classified into the toSet and fromSet during classification operation 708 as follows: fromSet={A, B}, and toSet={C, D}. Assertion halves A and B are classified in the fromSet because the sub-tree owner Organization1 is the fromKey organization of the keyed reference relationship. Assertion half C is classified in the toSet because the sub-tree owner Organization1 is the toKey organization of the keyed reference relationship. Assertion half D is classified in the toSet because the sub-tree owner Organization2 is the toKey organization of the keyed reference relationship.

After classification operation 708, the type of status check is determined. Three types of exemplary status check are "complete," "fromKey incomplete," and "toKey incomplete." As shown in FIG. 7, registry server 130 determines if an assertion completion status check is desired during status complete decision 710. If the status check desired by the publisher is a completion status check, operations 720, 722, 724 and 726 carry out the status check regarding completion of publisher assertions. If a completion status check is not desired, registry server 130 determines if a fromKey assertions incomplete status check is desired during fromKey incomplete decision 730. If the status check desired by the publisher is a fromKey assertions incomplete status check, operations 732, 734, 736 and 738 carry out the fromKey assertions incomplete status check. If a fromKey incomplete status check is not desired during status fromKey incomplete decision 730, registry server 130 determines if a toKey assertions incomplete status check is desired during toKey incomplete decision 740. If the status check desired by the publisher is a toKey assertions incomplete status check, operations 742, 744, 746 and 748 carry out the toKey assertions incomplete status check. If none of a completion status check, a fromKey incomplete status check or a toKey incomplete status check are desired, an error message is returned indicating an invalid status check request during fault operation 750. If one of a completion status check, a fromKey incomplete status check or a toKey incomplete status check is desired, an assertionStatusReport message is returned during status report message operation 760.

If the status check desired by the publisher is a completion status check, the completion status of each publisher assertion is determined beginning at operation 720. Each entry in the fromSet is checked to determine if there is a complementary entry in the toSet during toSet decision 722. If there is a toSet entry, the fromSet entry is added to a result set during operation 724. If there is not a toSet entry, the next entry is selected, and operations 722 and 724 are repeated. This process is repeated until there are no further entries in the fromSet to be selected. In this manner, a result set is generated which includes all complete publisher assertions.

Referring to the above example in which fromSet={A, B}, and toSet={C, D}, registry server 130 selects publisher assertion half A because it is the first entry in the fromSet during operation 720. Next, during operation 722, registry server 130 determines if assertion half A has a complementary assertion half in the toSet. In this case, D is a complementary assertion half to A. Accordingly, assertion half A is added to the result set during operation 724. Next, registry server 130 determines if the next assertion half B has a complementary assertion half in the toSet. Because assertion half B has no complementary assertion half, the public assertion corresponding to B is incomplete, and the assertion half B is not added to the result set. Thus, the result set only includes assertion half A which represents the only complete public assertion in the present example.

If the status check desired by the publisher is a fromKey assertions incomplete status check, the fromKey assertions incomplete status check is made beginning at operation 732. Each entry in the toSet is checked to determine if there is a complementary entry in the fromSet during fromSet decision 734. If there is not a fromSet entry, the toSet entry is added to a result set during operation 736. If there is a fromSet entry, the next toSet entry is selected, and operations 734 and 736 are repeated. This process is repeated until there are no further entries in the toSet to be selected. In this manner, a result set is generated which includes all toSet assertion halves which are incomplete (e.g., have no corresponding fromSet assertion half).

Referring to the above example in which fromSet={A, B}, and toSet={C, D}, registry server 130 selects publisher assertion half C because it is the first entry in the toSet during operation 732. Next, during operation 734, registry server 130 determines if assertion half C has a complementary assertion half in the fromSet. Because assertion half C has no complementary assertion half, the public assertion corresponding to C is incomplete, and the assertion half C is added to the result set. Next, registry server 130 determines if the next assertion half D has a complementary assertion half in the fromSet. In this case, A is a complementary assertion half to D. Accordingly, assertion half D is not added to the result set during operation 724. Thus, the result set only includes assertion half C which represents the only incomplete public assertion in the toSet in the present example.

If the status check desired by the publisher is a toKey assertions incomplete status check, the toKey assertions incomplete status check is made beginning at operation 742. Each entry in the fromSet is checked to determine if there is a complementary entry in the toSet during toSet decision 744. If there is not a toSet entry, the fromSet entry is added to a result set during operation 746. If there is a toSet entry, the next entry is selected, and operations 744 and 746 are repeated. This process is repeated until there are no further entries in the fromSet to be selected. In his manner, a result set is generated which includes all fromSet assertion halves which are incomplete (e.g., have no corresponding toSet assertion half).

Referring to the above example in which fromSet={A, B}, and toSet={C, D}, registry server 130 selects publisher assertion half A because it is the first entry in the fromSet during operation 742. Next, during operation 744, registry server 130 determines if assertion half A has a complementary assertion half in the toSet. In this case, D is a complementary assertion half to A. Accordingly, assertion half A is not added to the result set during operation 724. Next, registry server 130 determines if the next assertion half B has a complementary assertion half in the toSet. Because assertion half B has no complementary assertion half, the public assertion corresponding to B is incomplete, and the assertion half B is added to the result set. Thus, the result set only includes assertion half B which represents the only incomplete public assertion in the fromSet in the present example.

Figure 8:
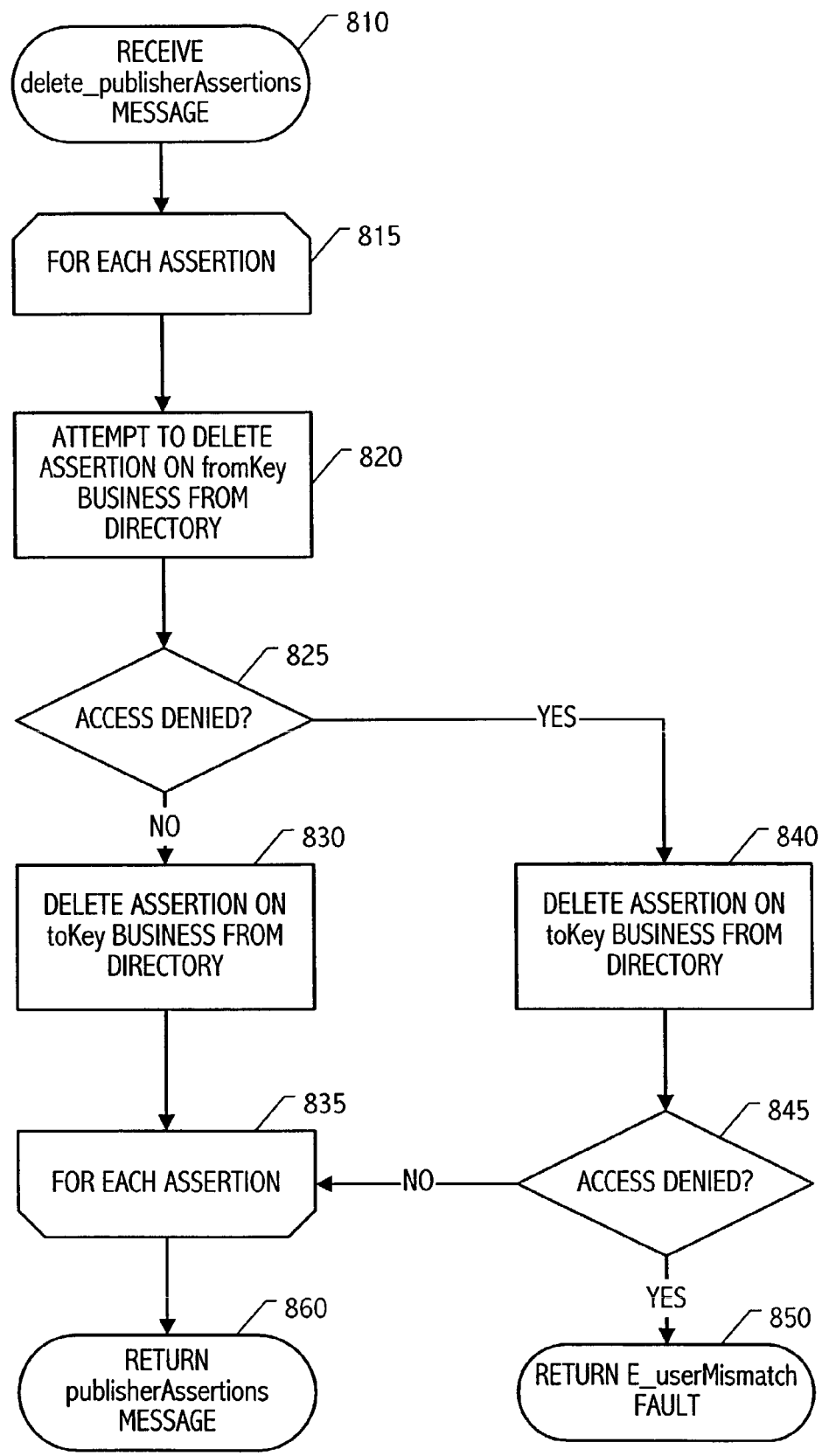
FIG. 8 is a flowchart showing a method of deleting a publisher assertion in the DIT of FIG. 1.

FIG. 8 is a flowchart showing a method of deleting a publisher assertion from DIT 170. A delete_publisherAssertion message is received at registry server 130 from a user of access system 180 (e.g., a publisher) during operation 810. In the presently described embodiment, a delete message includes a "fromKey" including information identifying a first organization of a relationship, a "toKey" including information identifying a second organization of a relationship, and a "keyedReference" including information identifying the relationship between the first and second organizations.

After the delete message is received during operation 810, a loop is entered for each assertion at operation 815. For each loop, a next assertion is selected, and various attempts to delete the selected assertion in DIT 170 are made. If the assertion is successfully deleted in at least one node of DIT 170, the loop exits successfully at operation 835, and a return message is sent during operation 860 indicating such success to the publisher at access system 800. If the assertion not successfully deleted in at least one node of DIT 170, an error message is returned during user mismatch fault operation 850, and the error message is sent to the publisher at access system 180.

More specifically, after the loop is entered at operation 815, registry server 130 sends a first delete message to directory server 150 during delete operation 820. Directory server 150 attempts to delete an assertion in the fromKey business sub-tree of DIT 170 responsive to receiving the delete message during delete operation 820. After the delete is attempted during delete operation 820, directory server 150 provides feedback to registry server 130, which in turn determines if access was denied (e.g., if the deletion was unsuccessful) during access decision 825.

If access was not denied during access decision 825, registry server 130 sends a second delete message to directory server 150 during delete operation 830. Directory server 150 attempts to delete an assertion in the toKey business sub-tree of DIT 170 responsive to receiving the second delete message during delete operation 830. After the delete is attempted during delete operation 830, registry server 130 sends a message to the publisher at access system 180 indicating that a publisher assertion has been deleted.

If access was denied during access decision 825, registry server 130 sends a another delete message to directory server 150 during delete operation 840. Directory server 150 attempts to delete an assertion in the toKey business sub-tree of DIT 170 responsive to receiving the delete message during delete operation 440. After the deletion is attempted during delete operation 840, directory server 150 provides feedback to registry server 130, which in turn determines if access was denied (e.g., if the deletion was unsuccessful) during access decision 845. If access was not denied during access decision 845, registry server 130 sends a message to the publisher at access system 180 indicating that a publisher assertion has been deleted. At this point, one incomplete or half toKey publisher assertion has been deleted, and access was denied regarding another half publisher assertion, if any. If access was denied during access decision 845, registry server 130 sends an error message during fault operation 850 to the publisher at access system 180 indicating that a user mismatch fault has occurred, and that no publisher assertion has been deleted.

In this manner, an attempt is made to delete a complete publisher assertion by deleting two separate and otherwise incomplete publisher assertions in each of two organizational sub-trees. If either one or both of these incomplete publisher assertions are deleted, a message indicating success is returned. If neither one of these incomplete publisher assertions are deleted, an error message is returned.

Figure 9:
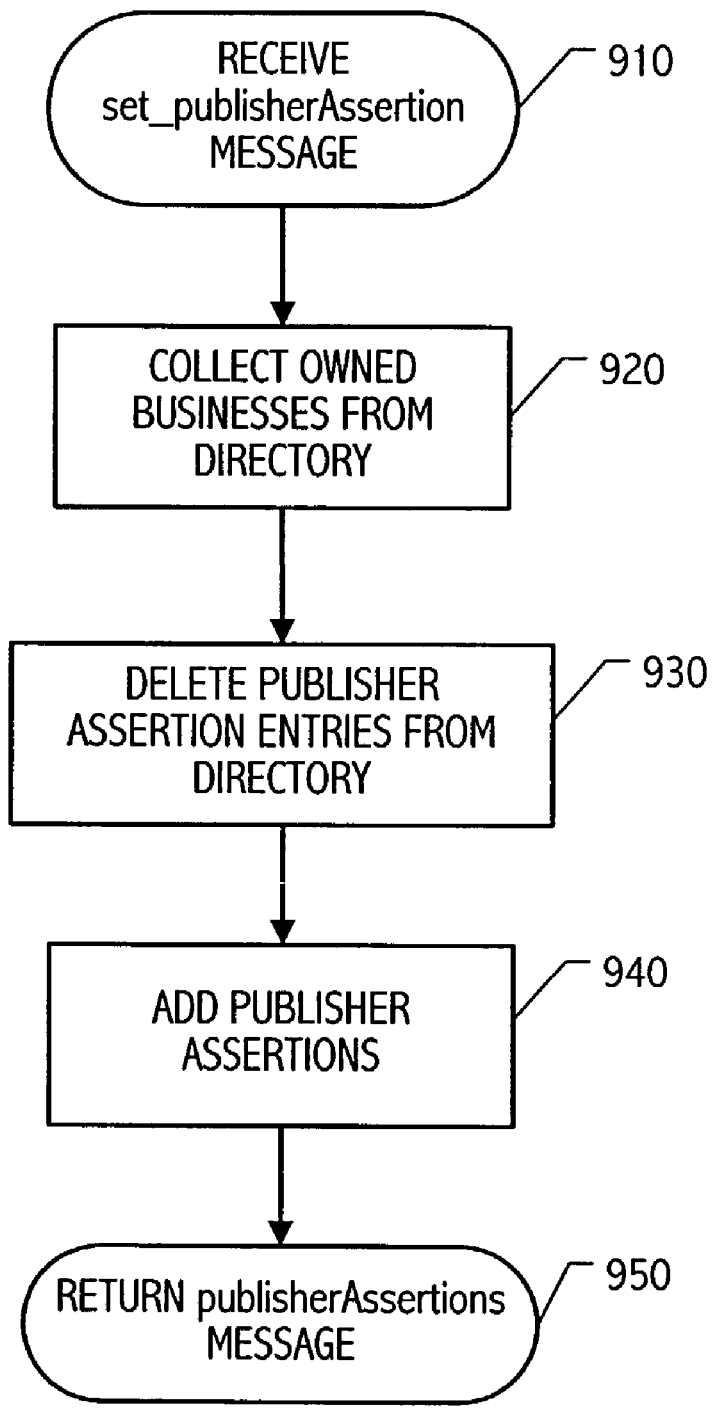
FIG. 9 is a flowchart showing a method of setting publisher assertions in the DIT of FIG. 1.

FIG. 9 is a flowchart showing a method of setting publisher assertions in the DIT of FIG. 1. During receive message operation 910, registry server 130 receives a set_publisherAssertions message from access system 180. Typically, an authorized publisher sends the message from access system 180 to registry server 130. After the set_publisherAssertions message is received during receive message operation 910, entries in a list of owned businesses are collected from DIT 170 during collect businesses operation 920. For example, registry server 130 sends a request message to directory server 150 instructing that all businesses, for which the publisher has authority to publish, be collected into a list. Directory server 150 returns a resulting list to registry server 130.

After collect businesses operation 920, all publisher assertion entries for each owned business are deleted. All publisher assertion information stored at nodes subordinate to the owned business nodes (e.g., PublisherAssertion1 node 254 subordinate to Organization1 node 222) is deleted from DIT 170 during operation 930.

Next, publisher assertions are added during add assertions operation 940. For example, the functionality of the operations of FIG. 4 may he used to add publisher assertions to DIT 170. In this manner, any of a publisher's incomplete publisher assertions are updated from an initial incomplete state to a subsequent set of replacement assertions. A publisher assertions message is returned to the publisher at access system 180 during return message operation 950.

The above description is intended to describe at least one embodiment of the invention. The above description is not intended to define the scope of the invention. Rather, the scope of the invention is defined in the claims below. Thus, other embodiments of the invention include other variations, modifications, additions, and/or improvements to the above description.

For example, those skilled in the art will recognize that boundaries between the functionality of the above described operations are merely illustrative. The functionality of multiple operations may be combined into a single operation, and/or the functionality of a single operations may be distributed in additional operations. Moreover, alternative embodiments may include multiple instances of a particular operation, and the order of operations may be altered in various other embodiments.

The above described embodiments are described with reference to the architectural blocks of FIG. 1 and the DIT of FIG. 2 for the sake of convenience. Notwithstanding any above exemplary description in which a particular architectural block is chosen to perform all or part of an operation, other architectural blocks may perform all or part of the described functionality of such operations. For example, although registry server 130 is described as driving much of the operational functionality of the various process flows, some of the functionality performed by registry server may be offloaded on to a smart directory server system configured to quickly perform the functionality at the directory server, thereby decreasing the amount of network traffic between registry server 130 and directory server 150.

The operations discussed herein may consist of steps carried out by system users, hardware modules and/or software modules. In other embodiments, the operations of FIGS. 3-9, for example, are directly or indirectly representative of software modules (e.g., factories, objects, routines, or other partitional software designations or software portions) resident on a computer readable medium and/or resident within a computer system and/or transmitted to the computer system as part of a computer program product. Thus, the operations referred to herein may correspond to modules or portions of modules (e.g., software, firmware or hardware modules, or combinations thereof). The functionality of operations referred to herein may correspond to the functionality of modules or portions of modules in various embodiments. Accordingly, the boundaries between modules are merely illustrative and alternative embodiments may merge modules or impose an alternative decomposition of functionality of modules. For example, the modules discussed herein may be decomposed into submodules to be executed as multiple computer processes. Moreover, alternative embodiments may combine multiple instances of a particular module or submodule.

The above described method, the operations thereof and modules therefor may be executed on a computer system configured to execute the operations of the method and/or may be executed from computer-readable media. Computer systems may be found in many forms including but not limited to mainframes, minicomputers, servers, workstations, personal computers, notepads, personal digital assistants, various wireless devices and embedded systems, just to name a few. A typical computer system includes at least one processing unit, associated memory and a number of input/output (I/O) devices. A computer system processes information according to a program and produces resultant output information via I/O devices. A program is a list of instructions such as a particular application program and/or an operating system. A computer program is typically stored internally on computer readable storage media or transmitted to the computer system via a computer readable transmission medium. A computer process typically includes an executing (running) program or portion of a program, current program values and state information, and the resources used by the operating system to manage the execution of the process. A parent computer process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

The method(s) described above may be embodied in a computer-readable medium for configuring a computer system to execute the method. One such computer-readable medium is directory server 150. The computer readable media may be permanently, removably or remotely coupled to system 100 or another system. The computer readable media may include, for example and without limitation, any number of the following: magnetic storage media including disk and tape storage media; optical storage media such as compact disk media (e.g., CD-ROM, CD-R, etc.) and digital video disk storage media; holographic memory; nonvolatile memory storage media including semiconductor-based memory units such as FLASH memory, EEPROM, EPROM, ROM; ferromagnetic digital memories; spintronic memories, volatile storage media including registers, buffers or caches, main memory, RAM, etc.; and data transmission media including permanent and intermittent computer networks, point-to-point telecommunication equipment, carrier wave transmission media, the Internet, just to name a few. Other new and various types of computer-readable media may be used to store and/or transmit the software modules discussed herein.

It is to be understood that the architecture(s) depicted herein (e.g., in FIG. 1) are merely exemplary, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled", to each other to achieve the desired functionality.

Because the above detailed description is exemplary, when "one embodiment" is described, it is an exemplary embodiment. Accordingly, the use of the word "one" in this context is not intended to indicate that one and only one embodiment may have a described feature. Rather, many other embodiments may, and often do, have the described feature of the exemplary "one embodiment." Thus, as used above, when the invention is described in the context of one embodiment, that one embodiment is one of many possible embodiments of the invention.

Notwithstanding the above caveat regarding the use of the words "one embodiment" in the detailed description, it will be understood by those within the art that if a specific number of an introduced claim element is intended in the below claims, such an intent will be explicitly recited in the claim, and in the absence of such recitation no such limitation is present or intended. For example, in the claims below, when a claim element is described as having "one" feature, it is intended that the element be limited to one and only one of the feature described. Furthermore, when a claim element is described in the claims below as including or comprising "a" feature, it is not intended that the element be limited to one and only one of the feature described. Rather, for example, the claim including "a" feature reads upon an apparatus or method including one or more of the feature in question. That is, because the apparatus or method in question includes a feature, the claim reads on the apparatus or method regardless of whether the apparatus or method includes another such similar feature. This use of the word "a" as a nonlimiting, introductory article to a feature of a claim is adopted herein by Applicants as being identical to the interpretation adopted by many courts in the past, notwithstanding any anomalous or precedential case law to the contrary that may be found. Similarly, when a claim element is described in the claims below as including or comprising an aforementioned feature (e.g., "the" feature), it is intended that the element not be limited to one and only one of the feature described merely by the incidental use of the definite article.

Furthermore, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles.

While particular embodiments of the present invention have been shown and described, it will be obvious to those skilled in the art that, based upon the teachings herein, various modifications, alternative constructions, and equivalents may be used without departing from the invention claimed herein. Consequently, the appended claims encompass within their scope all such changes, modifications, etc. as are within the spirit and scope of the invention. Furthermore, it is to be understood that the invention is solely defined by the appended claims. The above description is not intended to present an exhaustive list of embodiments of the invention. Unless expressly stated otherwise, each example presented herein is a nonlimiting or nonexclusive example, whether or not the terms nonlimiting, nonexclusive or similar terms are contemporaneously expressed with each example. Although an attempt has been made to outline some exemplary embodiments and exemplary variations thereto, other embodiments and/or variations are within the scope of the invention as defined in the claims below.

What is claimed is:

1. An apparatus comprising a publisher assertion regarding a relationship between first and second entities, the publisher assertion encoded within a directory information tree in a memory, the publisher assertion comprising:

a first publisher assertion node corresponding to a first entity node in the directory information tree, the first publisher assertion node including information regarding a relationship between the first and second entities; and a second publisher assertion node corresponding to a second entity node in the directory information tree, the second publisher assertion node including information regarding the relationship between the first and second entities, wherein each publisher assertion node represents a partial assertion of the relationship between the first and second entities, wherein the relationship is valid with the first and the second publisher assertion nodes if the relationship is a two-way relationship.

2. The apparatus of claim 1 further comprising an information processing system, the information processing system comprising:

the memory; and directory server software for accessing the directory information tree in the memory responsive to messages from another information processing system.

3. The apparatus of claim 2 further comprising a registry service, the registry service comprising:

at least one directory server system including the information processing system;

at least one registry server system coupled to the directory server system via a network connection, the registry server system coupled to modify the publisher assertion in the directory information tree.

4. A graph data structure encoded on at least one computer-readable medium, the graph data structure representable by a plurality of nodes coupled by edges, the plurality of nodes comprising:

a first organizational node corresponding to a first organization;

a second organizational node corresponding to a second organization;

a first relational node corresponding to the first organizational node to provide access to first relation information regarding a relation between the first and second organizations; wherein the first relation information is used to indicate a valid relationship if the graph includes a second relational node corresponding to the second organizational node to provide access to second relation information complementary to the first relation information.

5. The graph data structure of claim 4 wherein the graph data structure is a directory information tree configured to include the first and second relational nodes as descendents of the respective first and second organizational nodes.

6. A computer program product comprising:

at least one computer-readable medium software encoded on the at least one computer-readable medium for accessing a directory information tree data structure configured to access publisher assertions by accessing related publisher assertion parts in different tree nodes, wherein a publisher assertion part is an assertion of a relationship between organizations by an authorized publisher for at least one of the organizations, wherein a publisher assertion is complete if all assertion parts for the publisher assertion have been made.

7. The computer program product of claim 6 wherein the software comprises:

a software portion for collecting publisher assertion parts describing a relationship between a plurality of organizations from the directory information tree;

a software portion for discarding any incomplete assertion parts from the collected publisher assertion parts; and a software portion for returning information regarding organizations for which publisher assertion parts were not discarded.

8. The computer program product of claim 6 wherein the software comprises:

a software portion for attempting to save in the directory tree a publisher assertion part regarding each of a plurality of organizations in each of a plurality of publisher assertion nodes subordinate to each of a plurality of organizational nodes corresponding to each of the organizations, respectively.

9. The computer program product of claim 6 wherein the software comprises:

a software portion for collecting publisher assertion parts from the directory information tree into a list for organizations owned by a publisher;

a software portion for deleting from the list any duplicate publisher assertion parts; and a software portion for returning a message including information regarding the list.

10. The computer program product of claim 6 wherein the software comprises:

a software portion for collecting publisher assertion parts from the directory information tree into an owned assertions list for organizations owned by a publisher;

a software portion for classifying the publisher assertion parts in the list into first and second sets depending on relationships between organizations identified by the publisher assertion parts;

a software portion for adding to a complete assertion list information regarding each publisher assertion part in the first set which has a complementary publisher assertion part in the second set; and a software portion for returning a message including information regarding the complete assertion list.

* * * * *